United States Patent
Atsuta

(10) Patent No.: US 11,594,984 B2
(45) Date of Patent: Feb. 28, 2023

(54) CONTROL APPARATUS FOR VIBRATION MOTOR, VIBRATION APPARATUS HAVING THE SAME, AND CONTROL METHOD OF VIBRATION MOTOR

(71) Applicant: CANON KABUSHIKI KAISHA, Tokyo (JP)

(72) Inventor: Akio Atsuta, Yokosuka (JP)

(73) Assignee: Canon Kabushiki Kaisha, Tokyo (JP)

(*) Notice: Subject to any disclaimer, the term of this patent is extended or adjusted under 35 U.S.C. 154(b) by 352 days.

(21) Appl. No.: 17/030,067

(22) Filed: Sep. 23, 2020

(65) Prior Publication Data
US 2021/0099106 A1 Apr. 1, 2021

(30) Foreign Application Priority Data
Sep. 30, 2019 (JP) ............................. JP2019-180974

(51) Int. Cl.
| | |
|---|---|
| H02P 25/032 | (2016.01) |
| H02P 27/08 | (2006.01) |
| H02N 2/14 | (2006.01) |
| G02B 7/04 | (2021.01) |
| H02N 2/00 | (2006.01) |
| H04N 5/232 | (2006.01) |

(52) U.S. Cl.
CPC ............. H02N 2/142 (2013.01); G02B 7/04 (2013.01); H02N 2/008 (2013.01); H02P 25/032 (2016.02); H02P 27/085 (2013.01); H04N 5/23264 (2013.01)

(58) Field of Classification Search
CPC ............................. H02P 25/032; H02P 27/085
USPC ........................................................ 318/114
See application file for complete search history.

(56) References Cited

U.S. PATENT DOCUMENTS

| | | | | |
|---|---|---|---|---|
| 2019/0348927 A1* | 11/2019 | Atsuta | ............... | H02N 2/008 |
| 2020/0304042 A1* | 9/2020 | Atsuta | ............... | H02N 2/147 |

FOREIGN PATENT DOCUMENTS

| | | |
|---|---|---|
| JP | 09-294384 A | 11/1997 |
| JP | 2013-123335 A | 6/2013 |

* cited by examiner

*Primary Examiner* — Kawing Chan
(74) *Attorney, Agent, or Firm* — Canon U.S.A., Inc. I.P. Division

(57) ABSTRACT

A control apparatus to control a vibration motor includes a control unit. The vibration motor includes a vibration body and a contact body contacting the vibration body. The control apparatus applies alternating voltages, generated based on pulse width and frequency of pulse signals, to an electro-mechanical energy conversion element of the vibration motor to cause relative movement between the vibration and contact bodies at a target velocity. The pulse width and the frequency are (i) set such that a first steady velocity exceeds the target velocity, before the relative movement starts, and (ii) changed such that a second steady velocity is less than the first steady velocity, after the relative movement starts, and before an actual velocity at a time of the relative movement exceeds the target velocity. The pulse width or the frequency is controlled such that the relative movement is performed at the target velocity.

13 Claims, 18 Drawing Sheets

CONTROL APPARATUS FOR VIBRATION MOTOR, VIBRATION APPARATUS HAVING THE SAME, AND CONTROL METHOD OF VIBRATION MOTOR

BACKGROUND

Field

The present disclosure relates to a control apparatus for a vibration motor, a vibration apparatus and other apparatuses having a control apparatus for a vibration motor, and a control method of a vibration motor.

Description of the Related Art

As a non-electromagnetic driven type motor, a vibration motor is known. In the vibration motor (hereinafter also referred to as "motor"), a contact body is brought into contact with a vibration body formed by bonding a piezoelectric element, which is an example of an electro-mechanical energy conversion element, to an elastic body. The vibration motor is configured to extract vibration energy, which is generated in the vibration body by applying an alternating voltage to the electro-mechanical energy conversion element, as mechanical motion in a form of relative movement occurring between the vibration body and the contact body. An imaging apparatus, such as a camera apparatus and a video apparatus, (hereinafter also referred to as "imaging apparatus") has been commercialized. The imaging apparatus employs the vibration motor for automatic driving of a focus lens (auto-focus (AF) driving) or driving of a zoom lens (zoom driving).

As an example of such a vibration motor, a perspective view of the vibration motor (after assembly) is illustrated in FIG. 15 (refer to Japanese Patent Application Laid-Open No. 2013-123335).

FIG. 14 illustrates a vibration motor 200. The vibration motor 200 includes an elastic body 201 composed of a material that produces a small loss in vibration damping, such as metal, a nut 204, and a flexible substrate 203. Between the elastic body 201 and the nut 204, a piezoelectric element (not illustrated) is interposed. Applying a generated alternating voltage to the piezoelectric element through the flexible substrate 203 generates vibration in the piezoelectric element. An assembly of the elastic body, the nut, and the piezoelectric element is collectively referred to as the vibration body, which vibrates by vibration generated in the piezoelectric element.

The vibration motor 200 includes a moving body (contact body) 207, and a gear 209 configured to transmit driving force to an outside. Upon receiving a vibration of the vibration body, the contact body 207 rotates about an axis. Upon receiving the rotation of the contact body 207 about the axis, the gear 209 also rotates about the axis.

The vibration motor 200 includes a fixing member 211. Fixing screw holes arranged in the fixing member 211 in desired locations using screws allows the vibration motor 200 to be mounted in a desired location.

The vibration motor 200 includes a nut 212 for fixing the fixing member 211 to the vibration motor 200 side.

An imaging apparatus is required to drive a focus lens and/or a zoom lens (vibration motor that drives the focus lens and/or zoom lens) at a higher velocity at a time of still image capturing. In contrast, the imaging apparatus is also required to drive the focus lens or the like at a low velocity at a time of moving image capturing. This is because, at a time of still image capturing, only an image at a target focal length and angle of view is recorded, and at a time of moving image capturing in contrast, not only the image at the target focal length or the like, but also images generated until a focal length or the like reach the target focal length or the like are also recorded.

In the AF driving and zoom driving of the imaging apparatus described above, control (hereinafter also referred to as "target velocity control") is required to keep driving the focus lens and/or the zoom lens at a targeted velocity (hereinafter also referred to as "target velocity"). As a technique of achieving the target velocity control using the vibration motor, the following methods have been introduced: a method of changing a driving frequency (hereinafter referred to as "frequency"), and a method of changing a driving pulse width (hereinafter referred to as "pulse width") (Japanese Patent Application Laid-Open No. H09-294384).

In the technique discussed in Japanese Patent Application Laid-Open No. H09-294384, performing only frequency control cannot provide sufficient velocity resolution capability. Thus, performing pulse width control after setting a pulse width and a frequency to predetermined values at a time of a vibration motor driving start (hereinafter also referred to as "start-up") achieves the target velocity control having increased velocity resolution capability (refer to paragraph 0039 and FIG. 6 of Japanese Patent Application Laid-Open No. H09-294384).

In the conventional techniques, at a time of still image capturing, a velocity (hereinafter referred to as "steady velocity") becomes less than the target velocity when a steady state (a state where the velocity is constant and an acceleration is zero) is reached by driving the vibration motor using the pulse width and frequency set at a start-up. As described above, since the high velocity driving of the lens is required at a time of still image capturing, the setting is changed such that a driving velocity becomes closer to the target velocity (or increases) before the driving velocity based on the pulse width and frequency set at the time of the start-up reaches the steady velocity. Thus, so-called velocity overshoot, in which the driving velocity exceeds the target velocity, is unlikely to occur at a time of still image capturing.

At a time of moving image capturing, however, the steady velocity according to the pulse width and frequency set at the time of the start-up may exceed the target velocity. This is because driving of the focus lens or the like at a low velocity is also required at a time of moving image capturing, as described above. Thus, velocity overshoot is likely to occur at a time of moving image capturing.

A description will be given of the above matter with reference to FIGS. 16 and 17.

FIG. 16 illustrates a relationship between a frequency and a velocity and power, a pulse width control area S1, and a frequency control area S2, in a case where the vibration motor is controlled by a control apparatus for the vibration motor according to a conventional example. An area in which a pulse width is controlled is hereinafter also referred to as a "pulse width control area", and an area in which a frequency is controlled is hereinafter also referred to as a "frequency control area". FIG. 17 illustrates a relationship between time and a frequency, a pulse width, and a velocity, in a case where the vibration motor is controlled by the control apparatus for the vibration motor according to the conventional example. FIG. 18 illustrates a relationship between time and a frequency, (large and small) pulse widths, a velocity, and a friction force, in a case where the vibration motor is controlled by the control apparatus for the vibration motor according to the conventional example.

In FIG. 17, a frequency is decreased (driving force is increased) in a state where a pulse width is fixed to a maximum pulse width, which is a maximum value of pulse widths that can be set. While the frequency is being decreased, the control apparatus for the vibration motor starts (starts up) driving (relative movement) of the vibration motor (vibration body and contact body), and thereafter drives the vibration motor at the target velocity. The relative movement at the target velocity is performed by a velocity control in which operation parameters (pulse width, and frequency) are set based on a difference (hereinafter also referred to as "deviation") between the target velocity and an actual velocity.

At the time of the start-up, the vibration motor does not start up immediately due to friction force between the vibration body and the contact body even if an alternating voltage is applied to the piezoelectric element. Thus, it may take a long time (start-up time) to start up (to start relative movement) after the alternating voltage is applied to the piezoelectric element.

In the conventional example illustrated in FIG. 17, control is performed to decrease the frequency (increase driving force) until the vibration motor starts up to address prolonged start-up time. Although such control shortens the start-up time, the steady velocity based on the operation parameters at the time of the start-up exceeds the target velocity, and thus the velocity overshoot is likely to occur. Thus, in a case where a lens or the like is to be driven at a low velocity at a time of moving image capturing or the like, the driving is performed at a high velocity once, and images that abruptly change in velocity and provide a feeling of discomfort are recorded.

FIG. 18 illustrates start-up characteristics in a case where a pulse width is relatively large and start-up characteristics in a case where a pulse width is relatively small. As can be understood from FIG. 18, the velocity overshoot is prevented in a case where (steady velocity based on set pulse width and frequency is nearly equal to the target velocity and) the pulse width is relatively small in comparison with a case where the pulse width is relatively large. However, the start-up time is prolonged.

SUMMARY

An aspect of the present disclosure is directed to preventing prolongation of the start-up time while preventing the velocity overshoot caused by the pulse width and frequency set before the start-up.

According to an aspect of the present disclosure, a control apparatus is for a vibration motor, wherein the vibration motor includes a vibration body having an electro-mechanical energy conversion element, and a contact body in contact with the vibration body, and wherein the control apparatus is configured to apply a plurality of alternating voltages, generated based on a plurality of pulse signals, to the electro-mechanical energy conversion element to cause relative movement between the vibration body and the contact body, the control apparatus includes a control unit configured to control a pulse width and frequency of the plurality of pulse signals to cause the relative movement between the vibration body and the contact body at a target velocity, wherein the control unit is configured to perform operations including: setting the pulse width and the frequency such that a first steady velocity based on the pulse width and the frequency exceeds the target velocity, before the relative movement between the vibration body and the contact body starts, changing at least one of the pulse width or the frequency such that a second steady velocity at a time of the relative movement between the vibration body and the contact body is less than the first steady velocity, after the relative movement between the vibration body and the contact body starts, and before an actual velocity at a time of the relative movement between the vibration body and the contact body exceeds the target velocity, and controlling at least one of the pulse width or the frequency such that the relative movement between the vibration body and the contact body is performed at the target velocity, after changing at least one of the pulse width or the frequency.

Further features of the present disclosure will become apparent from the following description of exemplary embodiments with reference to the attached drawings.

DESCRIPTION OF THE EMBODIMENTS

Exemplary embodiments of the present disclosure will be described with reference to the accompanying drawings.

Figure 1:
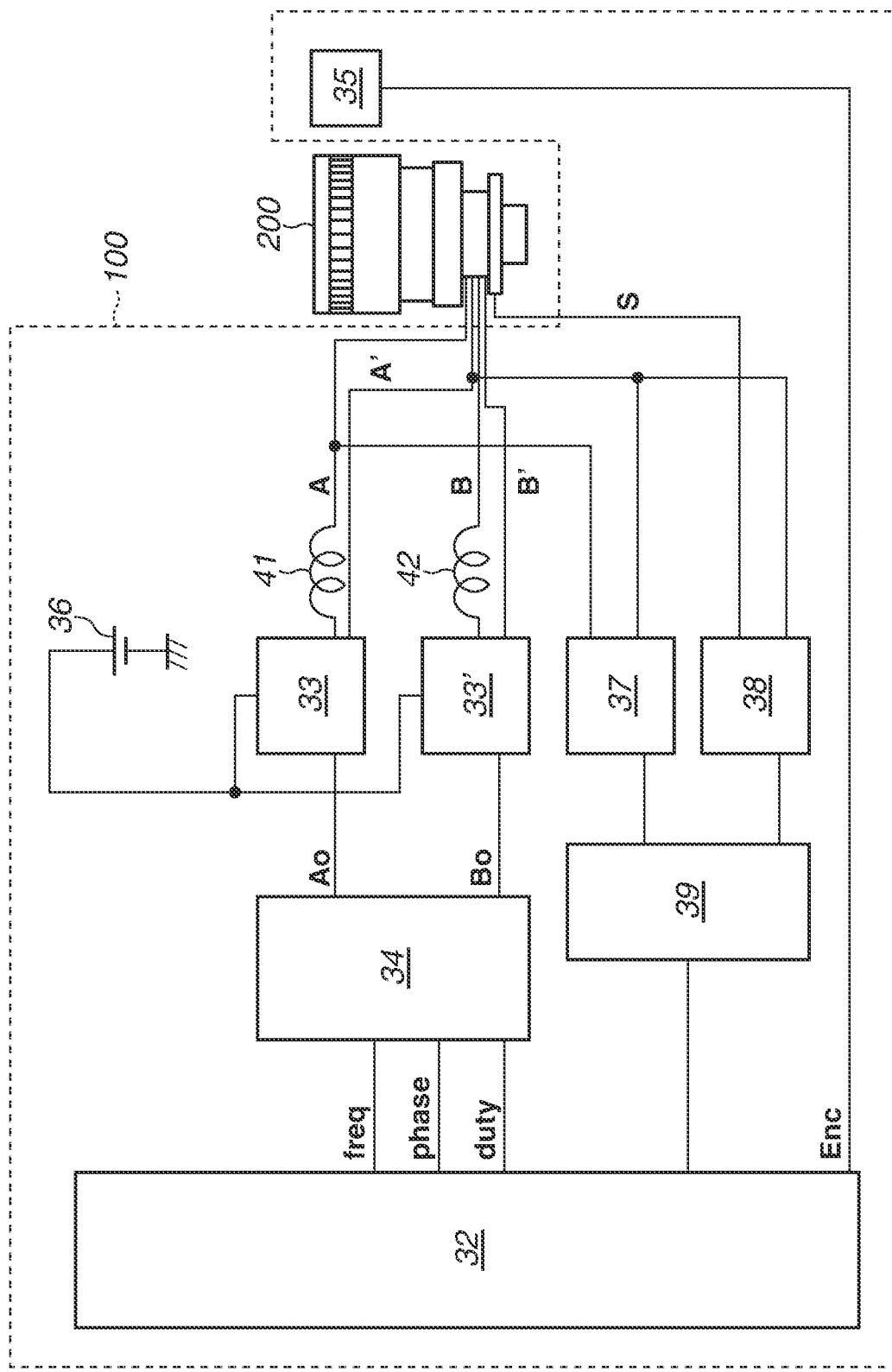
FIG. 1 is a block diagram illustrating a configuration of a control apparatus for a vibration motor according to the present disclosure.

A first exemplary embodiment regarding driving of a vibration motor (vibration actuator) at a low velocity will be described with reference to FIGS. 1 to 4. The present exemplary embodiment can prevent an excess velocity (velocity overshoot) caused by a pulse width and frequency set before start-up (start of relative movement between a vibration body and a contact body). The "relative movement" involves the vibration body and the contact body moving relative to each other. In a case where the vibration body and the contact body move relative to each other, there may be a case where the vibration body is fixed and the contact body is driven, and a case where the contact body is fixed and the vibration body is driven. FIG. 1 is a block diagram illustrating a configuration of a control apparatus (control circuit) for the vibration motor according to the present disclosure. FIG. 1 illustrates a vibration motor 200. Constituent elements other than the vibration motor 200 among constituent elements illustrated in FIG. 1 are those of the control apparatus 100 for the vibration motor 200. The control circuit 100 includes a control unit 32, a first switching circuit 33, a second switching circuit 33', an oscillator 34, a position detection unit 35, a power source unit 36, a first differential amplifier 37, a second differential amplifier 38, and a phase difference detection circuit 39.

The control unit 32 illustrated in FIG. 1 is a microcomputer unit (MCU), such as a micro processing unit (MPU), configured to manage control of the vibration motor 200. The control unit 32 includes a read only memory (ROM) configured to store a program, a random access memory (RAM) having a region for the program to be loaded and a region to store a parameter or calculation results, and a central processing unit (CPU) configured to execute the program. The oscillator 34 generates a first mode (A-mode) driving signal (pulse signals AO) and a second mode (B-mode) driving signal (pulse signals B0) based on a command value from the control unit 32. The oscillator 34 can change (control) a phase difference between the A-mode driving signal and the B-mode driving signal in a range from 0 to 360°. A first switching circuit 33 is configured to switch the A-mode driving signal (pulse signal AO) by a power source voltage. The first switching circuit 33 amplifies a switching voltage of the first switching circuit 33 by a boosting effect in combination with an inductance 41.

The second switching circuit 33' illustrated in FIG. 1 is configured to switch the B-mode driving signal (pulse signal B0) by a power source voltage. The second switching circuit 33' amplifies a switching voltage of the second switching circuit 33' by a boosting effect. The power source unit 36 is a power source configured to supply a voltage to the switching circuits 33 and 33'. Examples of the power source unit 36 include a battery cell. An analog-digital converter and the like can also be used for the power source unit 36. The first differential amplifier 37 generates a differential signal (differential voltage) between a driving voltage A (alternating voltage) applied to one end of a driving electrode of a piezoelectric element and a driving voltage A' (alternating voltage) applied to the other end of the driving electrode. A second differential amplifier 38 is configured to generate a differential signal (differential voltage) between the voltage S (piezoelectric element voltage S) and the driving voltage A'. The voltage S is obtained from an electrode (not illustrated) provided on the piezoelectric element and configured for vibration detection.

The phase difference detection circuit 39 illustrated in FIG. 1 detects phase differences of the differential voltages acquired by the differential amplifiers 37 and 38 described above. The control unit 32 detects a resonant state of the vibration motor 200 using phase difference values, which have been detected by the phase difference detection circuit 39, between the driving voltages A and A' and between the piezoelectric element voltage S and the driving voltage A'. If a phase difference value of the differential voltage decreases and becomes smaller than a certain value, the resonant state of the vibration motor 200 deviates from the resonant state. For this reason, the control unit 32 performs control not to decrease the driving frequency lower than a frequency corresponding to the certain value so that the phase difference value does not decrease to a value smaller than the certain value. Even in the present exemplary embodiment, when the phase difference value becomes smaller than a certain value, the driving frequency is controlled not to become lower or equal to a frequency corresponding to the certain value.

The position detection unit (hereinafter referred to as "detection unit") 35 illustrated in FIG. 1 is configured to detect a rotational position of a rotor composed of, for example, a photo-interrupter and a slit plate. Based on a result acquired by the detection unit 35, information about a position and velocity of the rotor is passed to the control unit 32, and the control unit 32 controls a rotational velocity of the vibration motor 200 based on the information. The information about the velocity may be calculated based on the position information acquired by the detection unit 35, or obtained directly from a separately provided velocity detection unit.

The oscillator 34 described above is capable of changing a phase difference between the A-mode driving signal and the B-mode driving signal (hereinafter also referred to as "AB phase difference") based on a command from the control unit 32.

Figure 2:
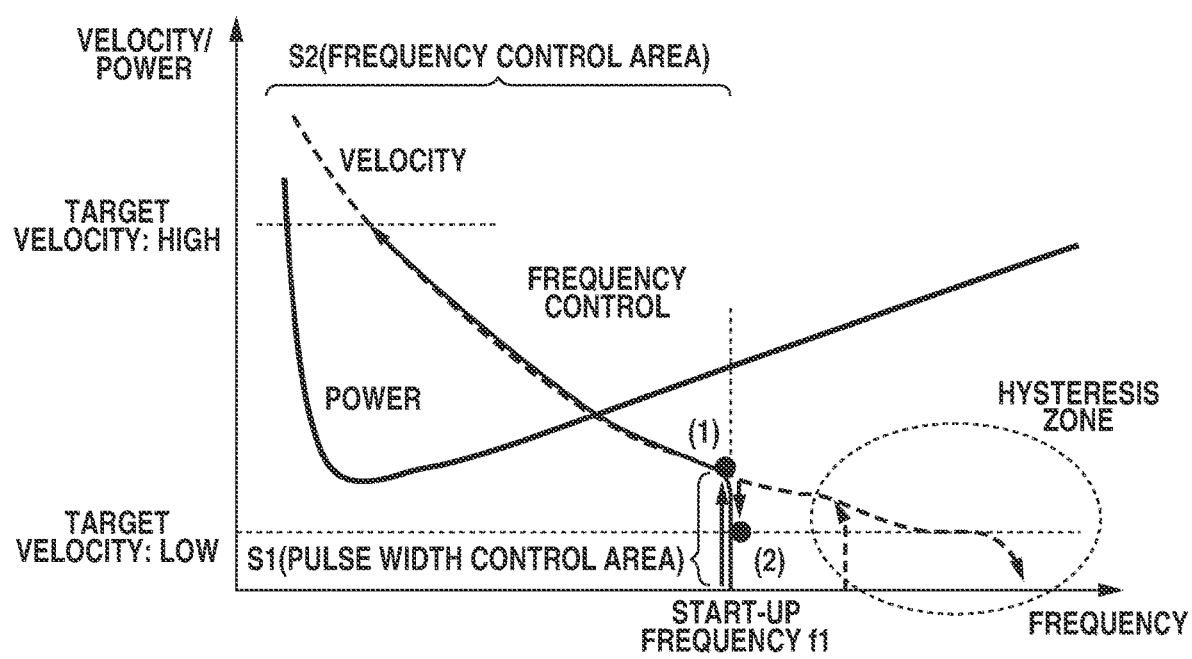
FIG. 2 is a graph diagram illustrating a relationship between a frequency and a velocity and power, and a pulse width control area and a frequency control area according to a first exemplary embodiment of the present disclosure, in a case where a vibration motor is controlled by the control apparatus according to the present disclosure.
Figure 3:
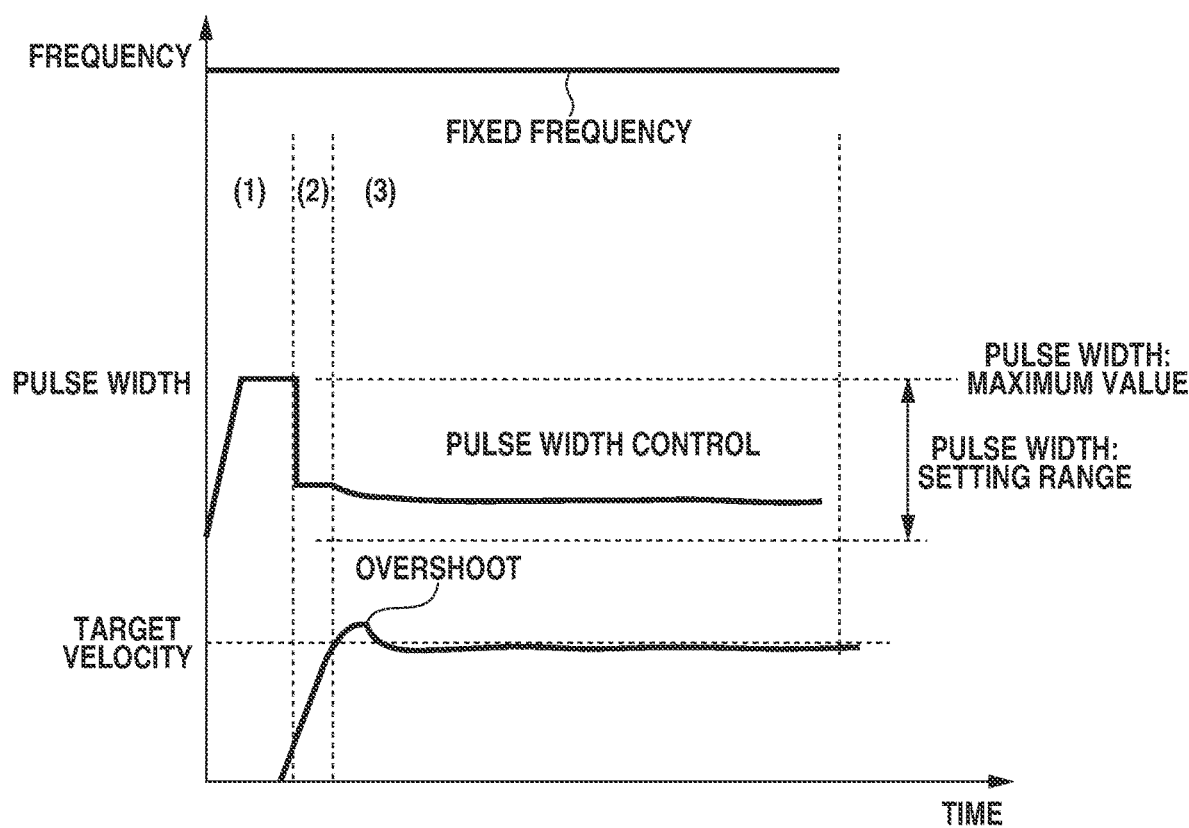
FIG. 3 is a graph diagram illustrating a relationship between time and a frequency, time and a pulse width, and time and a velocity according to the first exemplary embodiment of the present disclosure, in a case where the vibration motor is controlled by the control apparatus according to the present disclosure.
Figure 4:
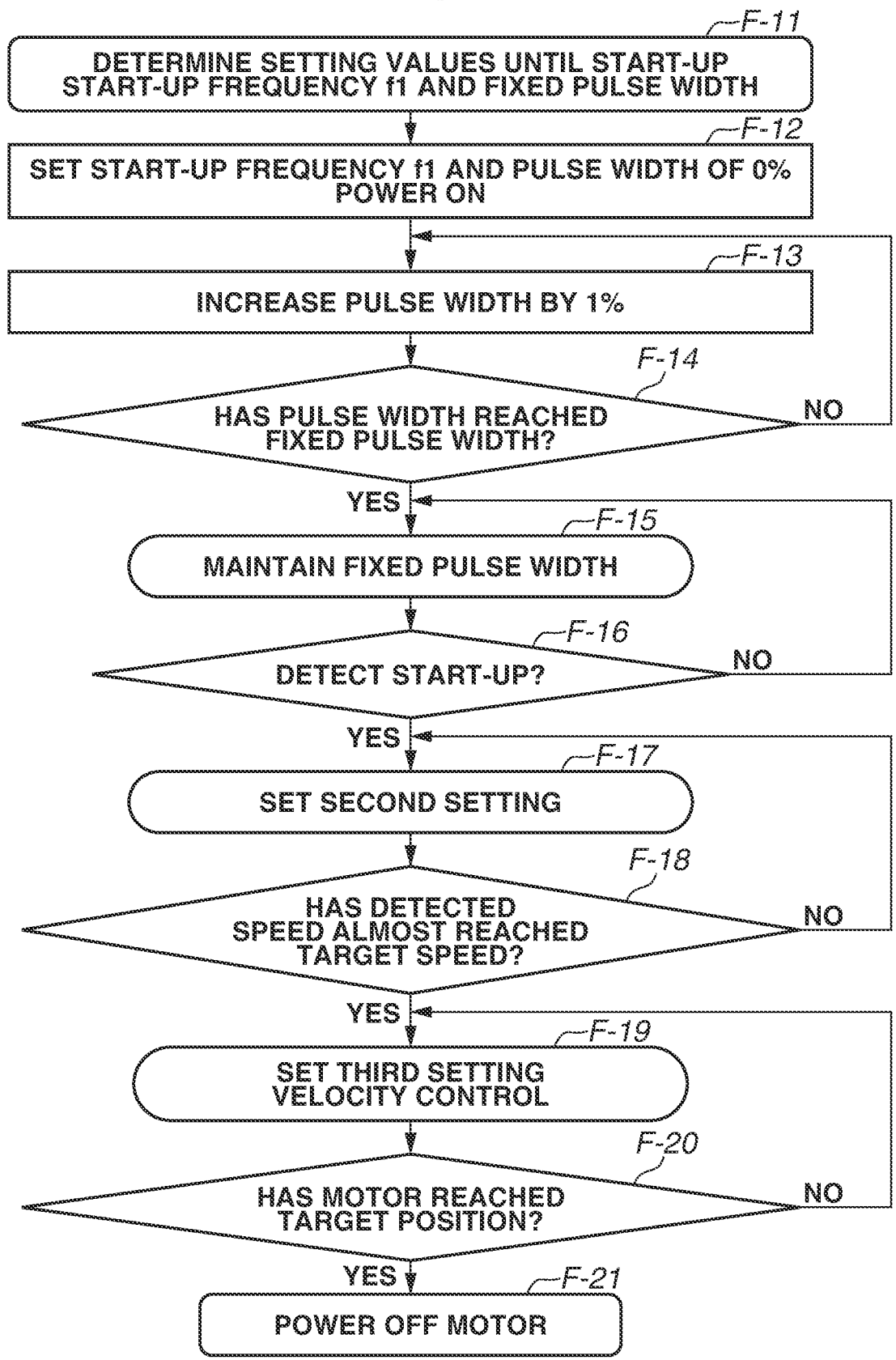
FIG. 4 is a flowchart illustrating an algorithm according to the first exemplary embodiment of the present disclosure.

FIG. 2 is a graph diagram illustrating a relationship between a frequency and a velocity and power, and a pulse width control area and a frequency control area according to the first exemplary embodiment of the present disclosure, in a case where the vibration motor 200 is controlled by the control apparatus 100 according to the present disclosure. FIG. 3 is a graph diagram illustrating a relationship between time and a frequency, time and a pulse width, and time and a velocity according to the first exemplary embodiment of the present disclosure, in a case where the vibration motor 200 is controlled by the control apparatus 100 according to the present disclosure. FIG. 4 is a flowchart illustrating an algorithm according to the first exemplary embodiment of the present disclosure.

The algorithm illustrated in FIG. 4 will be described with reference to FIGS. 1 to 3.

The present exemplary embodiment employs an aspect of performing velocity control by fixing a frequency and changing a pulse width (hereinafter also referred to as "pulse width control") at a time of a start-up. Here, a "start-up frequency" is a frequency set when the vibration motor 200 is started (at the time of start-up). Further, a "start-up pulse width" is a pulse width set when the vibration motor 200 is started.

The present exemplary embodiment can also employ an aspect of performing velocity control by fixing a pulse width and changing a frequency (hereinafter also referred to as "frequency control") at the time of the start-up. However, as can be understood from FIG. 2, consumed power (power consumption) tends to be large in a high frequency area (area on a right side in FIG. 2). The pulse width control does not use the high frequency area at a time of a start-up, and thus can prevent an increase in power consumption. When the frequency control is performed in a "target velocity: low" area illustrated in FIG. 2, operation becomes unstable due to a hysteresis zone, in which operations differ according to whether a frequency is increased or decreased. The pulse width control does not perform velocity control by a frequency in the "target velocity: low" area illustrated in FIG. 2, and thereby preventing the operation from becoming unstable. For this reason, the present exemplary embodiment employs an aspect of performing the pulse width control at a time of a start-up.

In FIG. 2, a pulse width is fixed to a maximum value (e.g., 50%) in the frequency control area. Thus, the present exemplary embodiment employs an aspect in which in the pulse width control area, a point at which the pulse width control is switched to the frequency control is where the pulse width becomes a maximum value, and the pulse width increases until reaching the point. Operations at the time of the start-up will be described using the flowchart.

In step F-11, before the start-up (start of relative movement), the control apparatus 100 for the vibration motor first determines a start-up frequency f1 and a fixed pulse width (pulse width fixed until start-up), which serve as a first setting (setting values until start-up), from data acquired in advance. In the present exemplary embodiment, the start-up frequency f1 is 50 kHz, and the fixed pulse width is 50%. A steady velocity (A first steady velocity) according to the fixed pulse width of 50% and the start-up frequency f1 (50 kHz) is determined so as to exceed the target velocity of the vibration motor 200.

In step F-12, the control apparatus 100 for the vibration motor sets the start-up frequency f1 and the pulse width of 0% to turn ON (power ON) the vibration motor 200.

In step F-13, the control apparatus 100 for the vibration motor increases the pulse width step by step (by 1%) until reaching the fixed pulse width. Specifically, in step F-14, the control apparatus 100 for the vibration motor determines whether the pulse width has reached the fixed pulse width after increasing the pulse width by one step (1%) in step F-13. In step F-15, if determining that the pulse width has reached the fixed pulse width (first pulse width) (YES in step F-14), the control apparatus 100 for the vibration motor maintains the fixed pulse width (first pulse width). If the pulse width has not reached the fixed pulse width, the control apparatus 100 for the vibration motor repeats steps F-13 and F-14 until the pulse width reaches the fixed pulse width.

A setting (1) illustrated in FIG. 3 (hereinafter referred to as "first setting") represents operations from steps F-11 to F-15.

While the operation of increasing the pulse width step by step (in steps F-13 and F-14) is an effective operation to reduce sounds at the time of the start-up and rush current to circuitry, the operation may be omitted if the vibration motor 200 is boosted (started) at a higher velocity. In step F-16, the control apparatus 100 for the vibration motor detects the start-up of the vibration motor 200. If the start-up of the vibration motor 200 is detected (YES in step F-16), the processing proceeds to step F17. In step F17, the control apparatus 100 for the vibration motor changes an operation parameter (first pulse width) to a second setting.

Although detection results of the start-up of the vibration motor 200 vary depending on a criteria for determining the start-up, the control apparatus 100 for the vibration motor determines that the vibration motor 200 has been started when a velocity becomes 1 rpm or more in the present exemplary embodiment. A setting at this state is set during a period of (2) illustrated in FIG. 3 (hereinafter referred to as "second setting"). In the second setting, the pulse width of the first setting is changed and fixed to a pulse width (second pulse width) nearly equal to a pulse width at which the vibration motor 200 operates at the target velocity (e.g., 10 rpm). In steps F-17 and F-18, the control apparatus 100 for the vibration motor causes the vibration motor 200 to operate in this state until a detected velocity almost reaches the target velocity. To prevent the velocity overshoot caused by the pulse width and frequency set before the start-up at this time, the steady velocity (a second steady velocity) according to the second pulse width and the start-up frequency f1 may be changed to be lower than the target velocity of the vibration motor 200.

When the detected velocity has almost reached the target velocity (YES in step F-18), the processing proceeds to step F-19. In step F-19, the control apparatus 100 for the vibration motor sets a third setting in which the pulse width is controlled based on a difference (deviation) between the target velocity and the detected velocity. A setting at this state is set during a period of (3) illustrated in FIG. 3 (hereinafter referred to as "third setting"). The third setting is for so-called normal velocity control. The control apparatus 100 for the vibration motor drives the vibration motor 200 until the vibration motor reaches a target position in this state. In step F-20, the control apparatus 100 for the vibration motor determines whether the vibration motor 200 has reached the target position. If it is determined that the vibration motor 200 has reached the target position (YES in step F-20), the processing proceeds to step F-21. In step F-21, the control apparatus 100 for the vibration motor turns OFF (powers OFF) the vibration motor 200 and stops the vibration motor 200.

In this manner, making settings (pulse width and frequency) of driving signals at the time of the start-up of the vibration motor 200 as the first to third settings can achieve the following effects. The settings can prevent prolongation of the start-up time while preventing the velocity overshoot caused by the pulse width and frequency set before the start-up. The first to third settings are summarized as follows:

(1) The setting to set the pulse width and frequency such that the steady velocity (the first steady velocity) according to the pulse width and frequency exceeds the target velocity, before the vibration motor 200 is started (first setting)

(2) The setting to change the pulse width such that the steady velocity (the second steady velocity) at the time of the driving is lower than the steady velocity (the first steady velocity) according to the pulse width and frequency set before the driving (second setting), after the vibration motor 200 is started and before the actual velocity at the time of driving exceeds the target velocity (3) The setting to control the pulse width such that the vibration motor 200 is driven at the target velocity (third setting), after the pulse width is changed The steady velocity (the second steady velocity) according to the second setting in the first exemplary embodiment is preferably 90% or more and 110% or less of the target velocity. The steady velocity is more preferably substantially equal to the target velocity. This is because the vibration motor 200 can shift to the third setting quickly.

A description will be given below of a second exemplary embodiment regarding driving of a vibration motor at an extremely low velocity with reference to FIGS. 5 to 7. The present exemplary embodiment can prevent prolongation of start-up time while preventing the velocity overshoot caused by a pulse width and frequency set before the start-up of the vibration motor. The present exemplary embodiment can also adapt to the velocity overshoot and/or a change in the start-up time due to an individual difference of the vibration motor and/or a temperature change.

Figure 5:
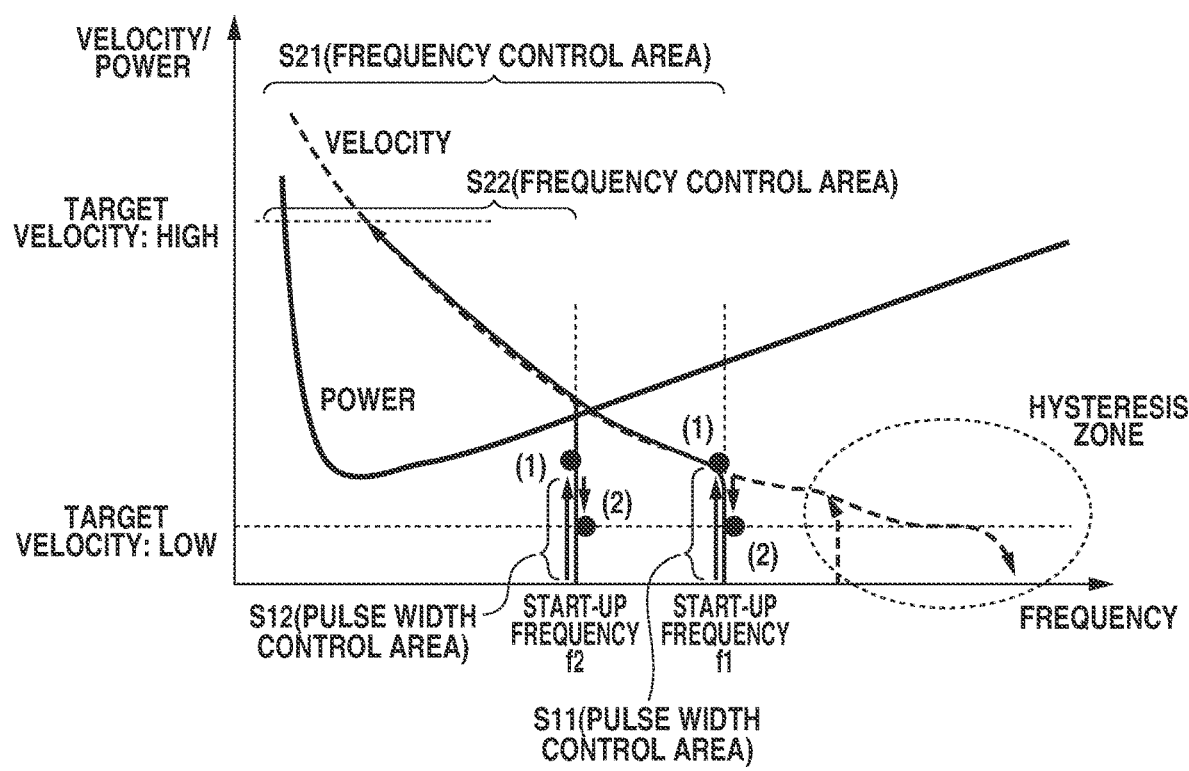
FIG. 5 is a graph diagram illustrating a relationship between a frequency and a velocity and power, and a pulse width control area and a frequency control area according to a second exemplary embodiment of the present disclosure, in a case where a vibration motor is controlled by a control apparatus according to the present disclosure.

FIG. 5 is a graph diagram illustrating a relationship between a frequency and a velocity and power, and a pulse width control area and a frequency control area according to the second exemplary embodiment of the present disclosure, in a case where the vibration motor is controlled by a control apparatus according to the present disclosure. In FIG. 5, the pulse width is 50% at a time of a frequency control. A curve of the velocity in the frequency control area is illustrated in a state where the pulse width is 50%. It can be understood that decreasing the frequency increases the velocity.

The start-up frequency f1 is set to 50 kHz and the fixed pulse width is set to 50% in the first exemplary embodiment.

Figure 6:
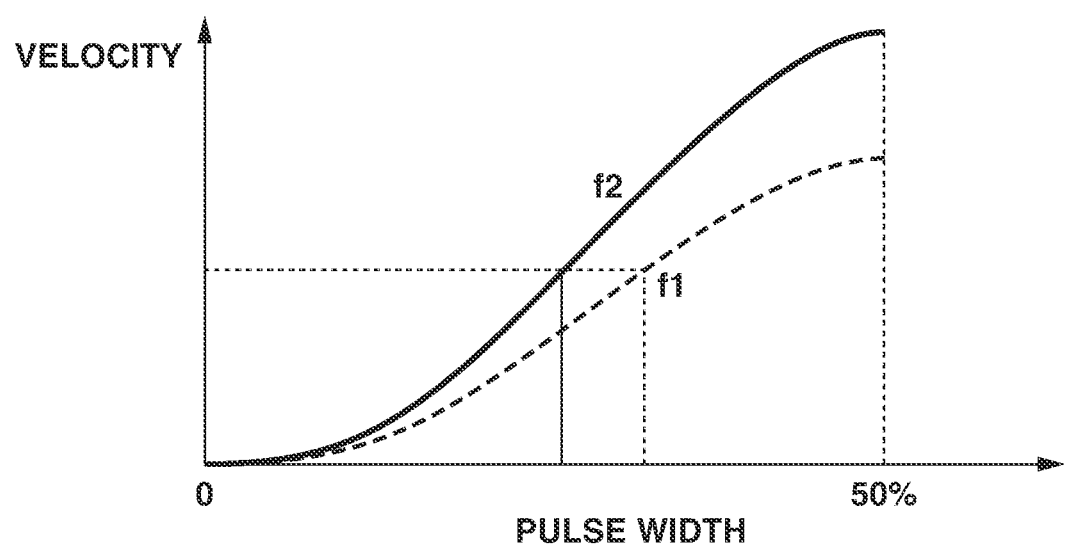
FIG. 6 is a graph diagram illustrating a relationship between a pulse width and a velocity with respect to different frequencies.

FIG. 6 is a graph diagram illustrating a relationship between a pulse width and a velocity with respect to different frequencies. At a start-up frequency f2, the relationship between the pulse width and the velocity changes. When the pulse width is 50%, the vibration motor operates at a higher velocity than the velocity at the start-up frequency f1. Thus, it can be understood that at the start-up frequency f2, the pulse width is to be made smaller than the pulse width at the start-up frequency f1 so that the vibration motor operates at a velocity equal to a velocity at the start-up frequency f1.

The overshoot cannot be prevented even with the setting (1) that allows the vibration motor 200 to start at a high velocity without causing the overshoot unless the pulse width is set to be small. Thus, recognizing that to which frequency of the motor characteristics the start-up frequency is set and setting the pulse width according to the frequency allows the vibration motor to operate at a high velocity without causing the overshoot no matter to which frequency the start-up frequency is set.

Figure 7:
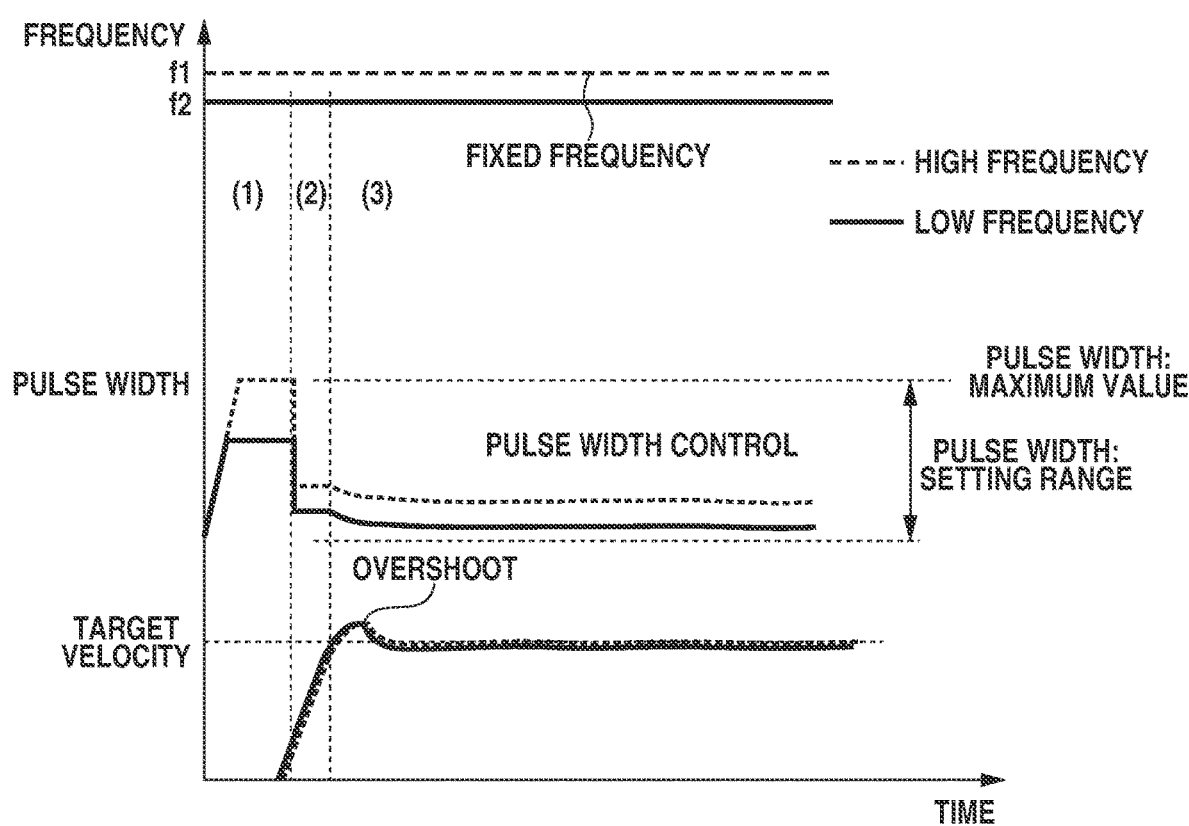
FIG. 7 is a graph diagram illustrating a relationship between time and a frequency, time and a pulse width, and time and a velocity according to the second exemplary embodiment of the present disclosure, in a case where the vibration motor is controlled by the control apparatus according to the present disclosure.

FIG. 7 is a graph diagram illustrating a relationship between time and a frequency, time and a pulse width, and time and a velocity according to the second exemplary embodiment of the present disclosure, in a case where the vibration motor is controlled by the control apparatus according to the present disclosure. As described above, at the start-up frequency f2, which is lower than the start-up frequency f1, making the pulse width of the setting (1) and the pulse width of the setting (2) smaller than those at the start-up frequency f1 can achieve start-up characteristics that are unlikely to cause the overshoot.

As a method of recognizing to which frequency of the motor characteristics the start-up frequency is set, the present exemplary embodiment employs a method of knowing the frequency from what value is the pulse width at the time of control at a low velocity according to the setting (3). However, a method of recognizing the frequency is not limited to this method. The method may be a method of recognizing the frequency by grasping a relationship between temperatures and the frequency characteristics of the vibration motor, creating a table of the relationship, and detecting a temperature using a temperature sensor.

The flowchart according to the present exemplary embodiment is nearly the same as the flowchart according to the first exemplary embodiment illustrated in FIG. 4. A difference from the first exemplary embodiment is that the "setting values until the start-up" described in step F-11 and the "second setting" describe in step F-17.

In this manner, knowing to which frequency of the motor characteristics the start-up frequency is set allows the vibration motor to operate at a high velocity without causing the overshoot even if an environment change, a load change, or the like occurs.

A description will be given below of a third exemplary embodiment regarding driving of a vibration motor at a low velocity with reference to FIG. 8. In the present exemplary embodiment, a control apparatus for a vibration motor different from the control apparatus according to the first exemplary embodiment can prevent the velocity overshoot caused by a pulse width and frequency set before the start-up.

Figure 8:
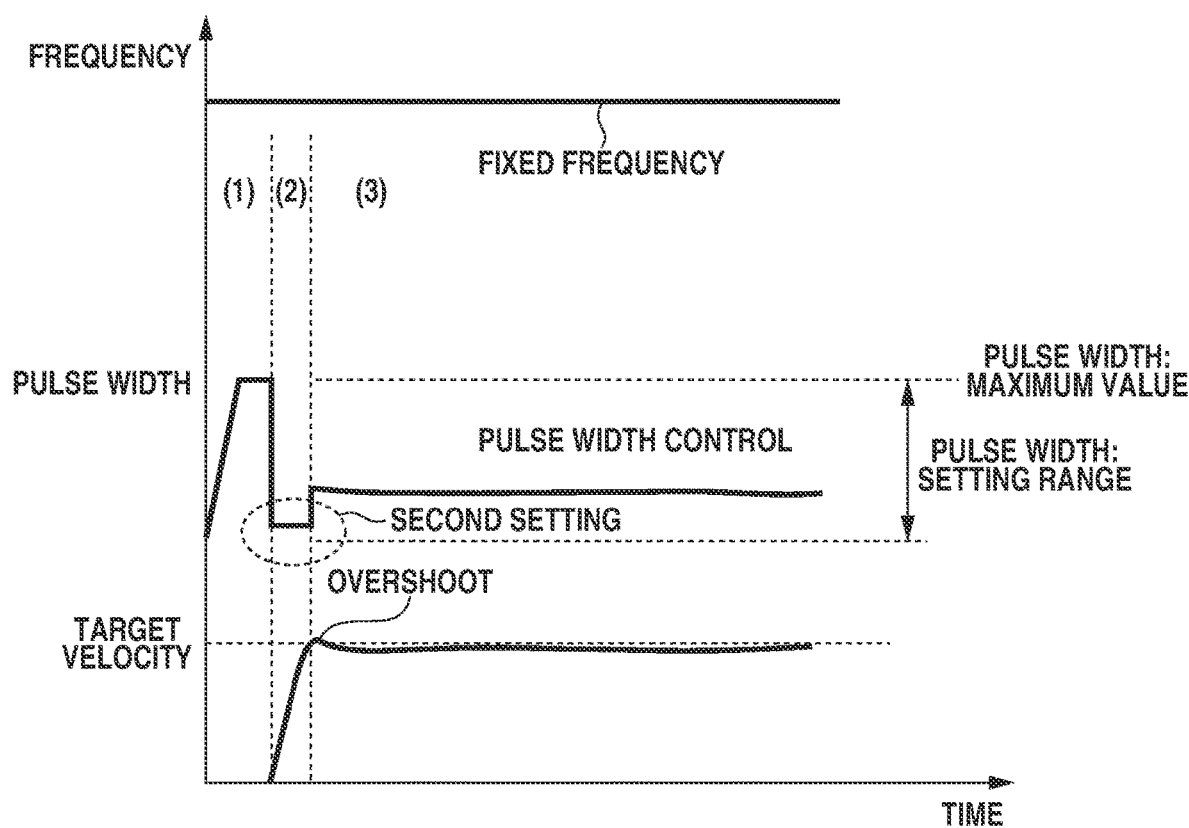
FIG. 8 is a graph diagram illustrating a relationship between time and a frequency, time and a pulse width, and time and a velocity according to a third exemplary embodiment of the present disclosure, in a case where a vibration motor is controlled by a control apparatus according to the present disclosure.

FIG. 8 is a graph diagram illustrating a relationship between time and a frequency, time and a pulse width, and time and a velocity according to the third exemplary embodiment of the present disclosure, in a case where the vibration motor is controlled by the control apparatus according to the present disclosure. Comparing FIG. 8 and FIG. 3, the setting (2) (second setting) is largely different from each other.

In the present exemplary embodiment, the setting (2) to keep the overshoot small is changed from the setting under control by the control apparatus 100 for the vibration motor according to the present disclosure (FIG. 3). This corresponds to part of the operation of the setting (2) circled by a dotted line marked in FIG. 8. In the first and second exemplary embodiments, the setting (2) (second setting) to keep the overshoot small is set to the operation parameter of the steady state at the time of the velocity control. In contrast, the present exemplary embodiment employs a setting to generate driving force smaller than the driving force in the steady state, i.e., fixes the pulse width to a smaller value.

In the second setting, the pulse width is set to a value larger than a minimum pulse width (e.g., 15%) at which the vibration motor can be driven and smaller than a pulse width (e.g., 25%) in the steady state in which the vibration motor operates at the target velocity. Although specific numerical values are omitted in FIG. 8, the pulse width is set to 18% in the present exemplary embodiment.

The present exemplary embodiment will be described with reference to the flowchart illustrated in FIG. 4.

A difference from the first exemplary embodiment is the second setting in step F-17. That is, while the pulse width in the first exemplary embodiment is set such that the actual velocity is equal to the target velocity, the pulse width in the present exemplary embodiment is set to be larger than the minimum pulse width at which the vibration motor can be driven and smaller than the pulse width at which the actual velocity is lower than the target velocity.

Control with the third setting, i.e., control of the pulse width according to a difference (deviation) between the target velocity and the detected velocity when the detected velocity has almost reached the target velocity is similar to the control according to the first and second exemplary embodiments. Making such a setting can keep the driving force that may cause the overshoot to a minimum. With the setting to prevent the overshoot or the setting (1) to start the vibration motor at a high velocity without causing the overshoot, it is possible to provide the driving force to start the vibration motor at a high velocity. This makes it possible to start the vibration motor at a high velocity without causing the overshoot.

Figure 10:
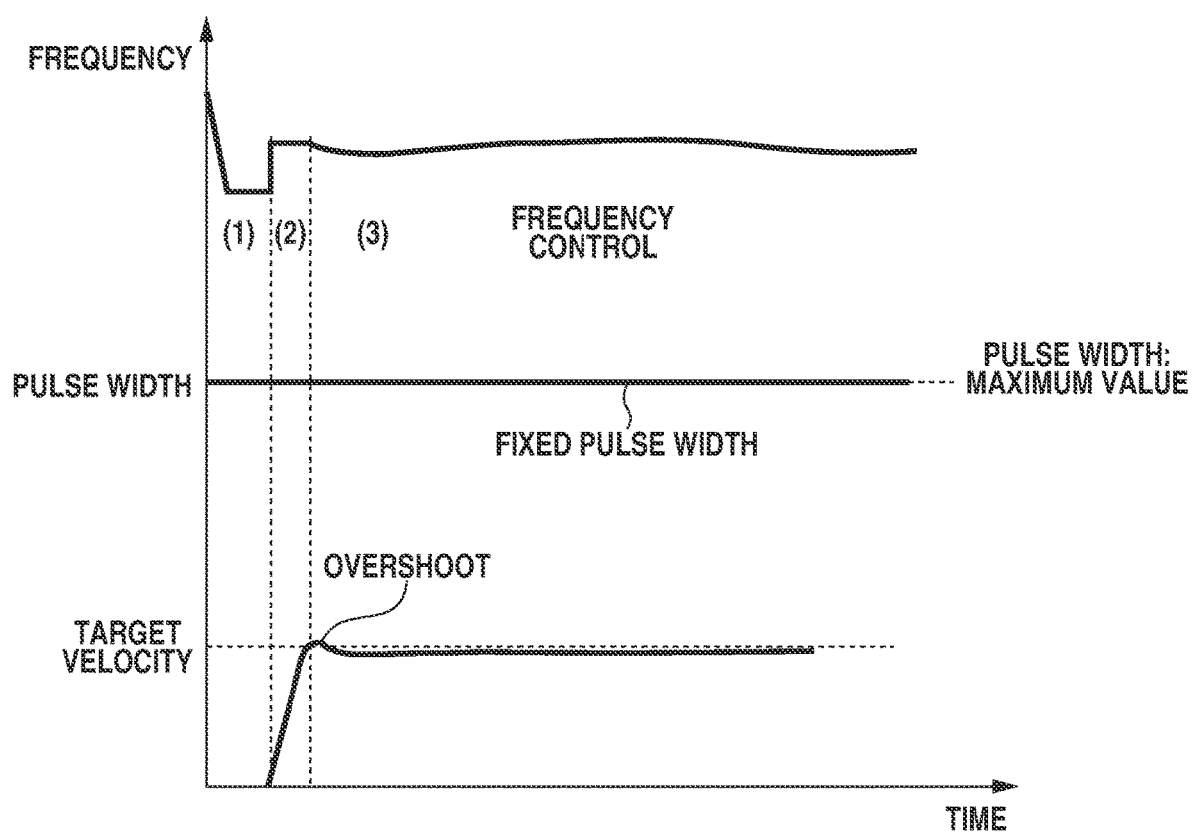
FIG. 10 is a graph diagram illustrating a relationship between time and a frequency, time and a pulse width, and time and a velocity according to the fourth exemplary embodiment of the present disclosure, in a case where the vibration motor is controlled by the control apparatus according to the present disclosure.
Figure 11:
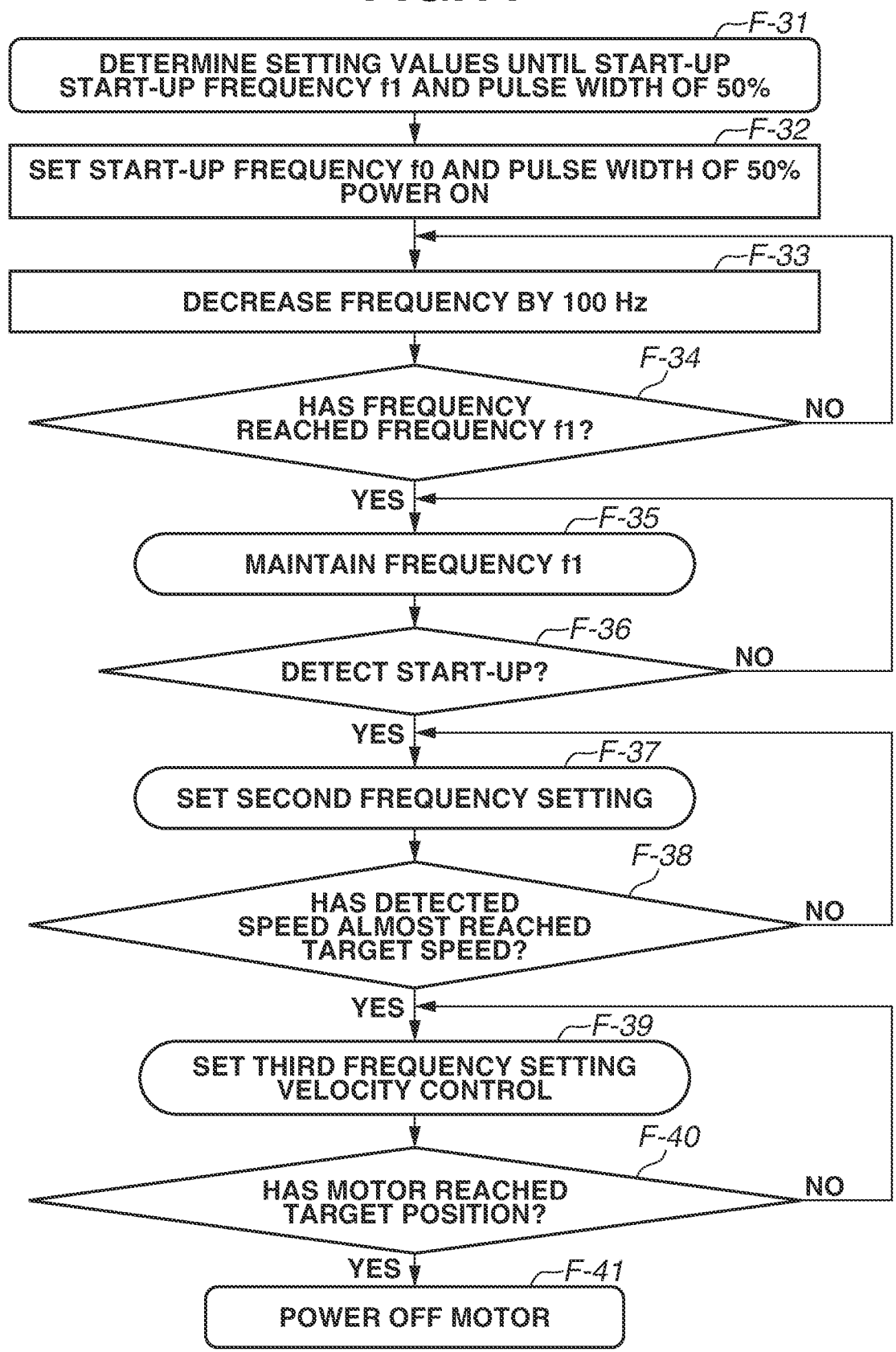
FIG. 11 is a flowchart illustrating an algorithm according to the fourth exemplary embodiment of the present disclosure.

A description will be given below of a fourth exemplary embodiment regarding driving of a vibration motor at a low velocity with reference to FIGS. 9 to 11. In the present exemplary embodiment, a control apparatus for a vibration motor different from the control apparatus according to the first exemplary embodiment can prevent the velocity overshoot caused by a pulse width and frequency set before the start-up.

Figure 9:
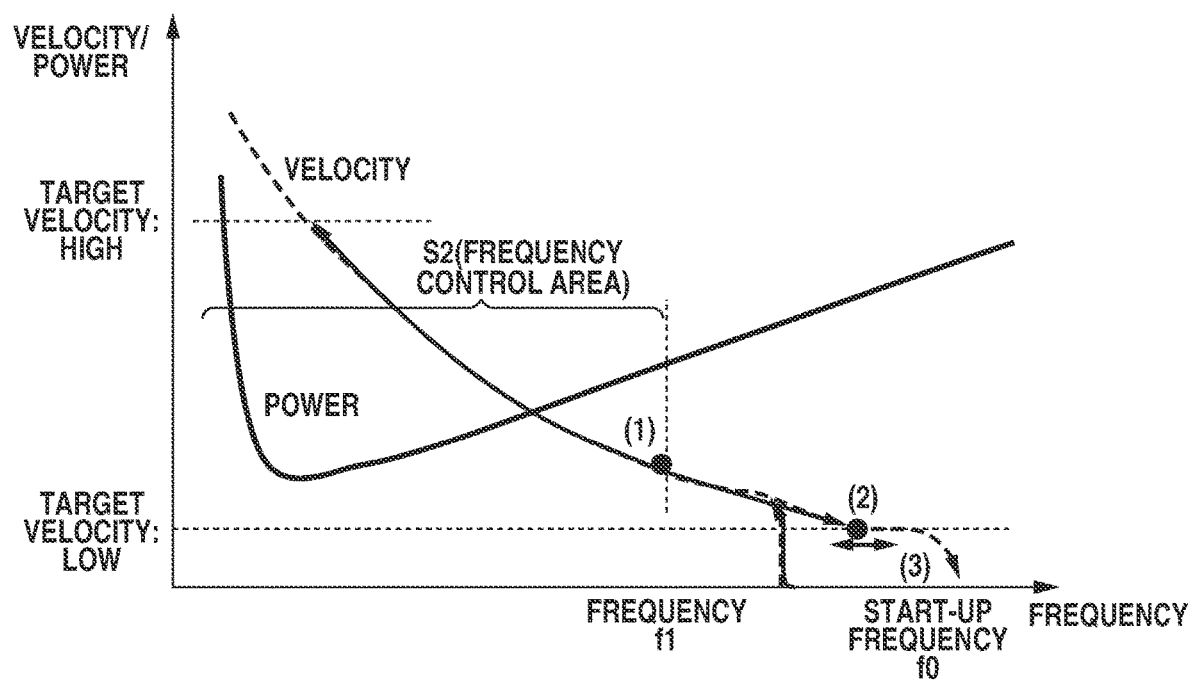
FIG. 9 is a graph diagram illustrating a relationship between a frequency and a velocity and power, and a frequency control area according to a fourth exemplary embodiment of the present disclosure, in a case where a vibration motor is controlled by a control apparatus according to the present disclosure.

FIG. 9 is a graph diagram illustrating a relationship between a frequency and a velocity and power, and a frequency control area according to the fourth exemplary embodiment of the present disclosure, in a case where a vibration motor is controlled by a control apparatus according to the present disclosure. FIG. 10 is a graph diagram illustrating a relationship between time and a frequency, time and a pulse width, and time and a velocity according to the fourth exemplary embodiment of the present disclosure, in a case where the vibration motor is controlled by the control apparatus according to the present disclosure (pulse width is fixed). FIG. 11 is a flowchart illustrating an algorithm according to the fourth exemplary embodiment of the present disclosure.

The algorithm illustrated in FIG. 11 will be described with reference to FIGS. 9 to 10.

As described in the first exemplary embodiment, in a case where the frequency control according to the present exemplary embodiment is performed, power consumption tends to increase because the frequency area that consumes a significant amount power is used. However, there is no need to perform the pulse width control, which is advantageous in simplifying the control.

In step F-31, before the start-up, the control apparatus 100 for the vibration motor first determines the frequency f1 and the pulse width that serve as the first setting (setting values until start-up (start-up is detected)) using data that can be acquired in advance. The frequency f1 is set to 50 kHz and the pulse width is set to 50% in the present exemplary embodiment. The steady velocity (The first steady velocity) based on the fixed pulse width of 50% and the frequency f1 (50 kHz) is determined so as to exceed the target velocity of the vibration motor.

In step F-32, the control apparatus 100 for the vibration motor sets a start-up frequency f0 to 55 kHz, and the pulse width to 50% to power ON the vibration motor.

In step F-33, the control apparatus 100 for the vibration motor decreases the frequency from the start-up frequency f0 to the frequency f1 step by step. In the present exemplary embodiment, one step corresponds to 100 Hz (step F-33). Specifically, in step F-33, the control apparatus 100 for the vibration motor decreases the frequency by one step. In step F-34, the control apparatus 100 for the vibration motor determines whether the frequency has reached the frequency f1 (50 kHz). If the frequency is determined to have reached the frequency f1 (YES in step F-34), the processing proceeds to step F-35. In step F-35, the control apparatus 100 for the vibration motor maintains the frequency f1.

The setting (1) illustrated in FIG. 9 represents the setting described above. Since the operation to gradually decrease the frequency (performed in steps F-33 and F-34) is equivalent to the operation to gradually increase amplitude of vibration, it is an effective operation to decrease sounds at the time of the start-up. However, the operation may be omitted when the vibration motor is to be boosted (started) at a higher velocity.

The frequency f1 described above is set such that the vibration motor can be started at a high velocity without causing the overshoot. This setting is referred to as the first setting.

In step F-36, the control apparatus 100 for the vibration motor detects the start-up of the vibration motor 200. If the start-up of the vibration motor 200 is detected (YES in step F-36), the process proceeds to step F-37. In step F-37, the control apparatus 100 for the vibration motor changes the operation parameter (first frequency) to the second setting. In the second setting, the frequency f1 of the first setting is changed and fixed to a frequency substantially equal to the pulse width at which the vibration motor operates at the target velocity (frequency at which vibration motor operates at 70% or more and 90% or less of the target velocity). In step F-37, the control apparatus 100 for the vibration motor causes the vibration motor to operate until the detected velocity reaches the target velocity. The second setting described above is the setting to keep the overshoot to a minimum.

In step F-38, the control apparatus 100 for the vibration motor determines whether the detected velocity has almost reached the target velocity. If the detected velocity has almost reached the target velocity (YES in step F-38), the processing proceeds to step F-39. In step F-39, the control apparatus 100 for the vibration motor sets the third setting in which the frequency is controlled based on a difference (deviation) between the target velocity and the detected velocity. The third setting is for so-called normal velocity control and the control apparatus 100 for the vibration motor drives the vibration motor 200 until reaching the target position in this state. In step F-40, the control apparatus 100 for the vibration motor detects that the vibration motor 200 has reached the target position. If the vibration motor 200 is detected to have reached the target position (YES in step F-40), the processing proceeds to step F-41. In step F-41, the control apparatus 100 for the vibration motor turns OFF (powers OFF) the vibration motor 200 and stops the vibration motor 200.

In this manner, settings (pulse width and frequency) of driving signals at the time of the start-up of the vibration motor 200 are made using the pulse width according to the first to third exemplary embodiments. In contrast, making the settings (1) to (3) described below using the frequency according to the present exemplary embodiment can prevent prolongation of the start-up time while preventing the velocity overshoot caused by the pulse width and frequency set before the start-up.

(1) The setting to set the pulse width and frequency such that the steady velocity (the first steady velocity) according to the pulse width and frequency exceeds the target velocity, before the vibration motor is started (first setting)

(2) The setting to change the frequency such that the steady velocity (the second steady velocity) at the time of the driving is lower than the steady velocity (the first steady velocity) according to the pulse width and frequency set before the driving (second setting), after the vibration motor is started and before the actual velocity at the time of driving exceeds the target velocity (3) The setting to control the frequency such that the vibration motor is driven at the target velocity (third setting), after the frequency is changed The steady velocity according (the second steady velocity) to the second setting is preferably from 90% or more and 110% or less of the target velocity. The steady velocity is more preferably nearly equal to the target velocity. This is because the vibration motor can shift to the third setting quickly.

While the frequency is fixed in the second and third settings according to the first to third exemplary embodiments and the pulse width is fixed in the second and third settings according to the fourth exemplary embodiment, the present disclosure is not limited thereto. For example, settings may be employed in which the pulse width is fixed in the second setting and the frequency is fixed in the third setting, or the frequency is fixed in the second setting and the pulse width is fixed in the third setting. Furthermore, both the pulse width and the frequency are not necessarily fixed in the second and third settings.

Figure 14:
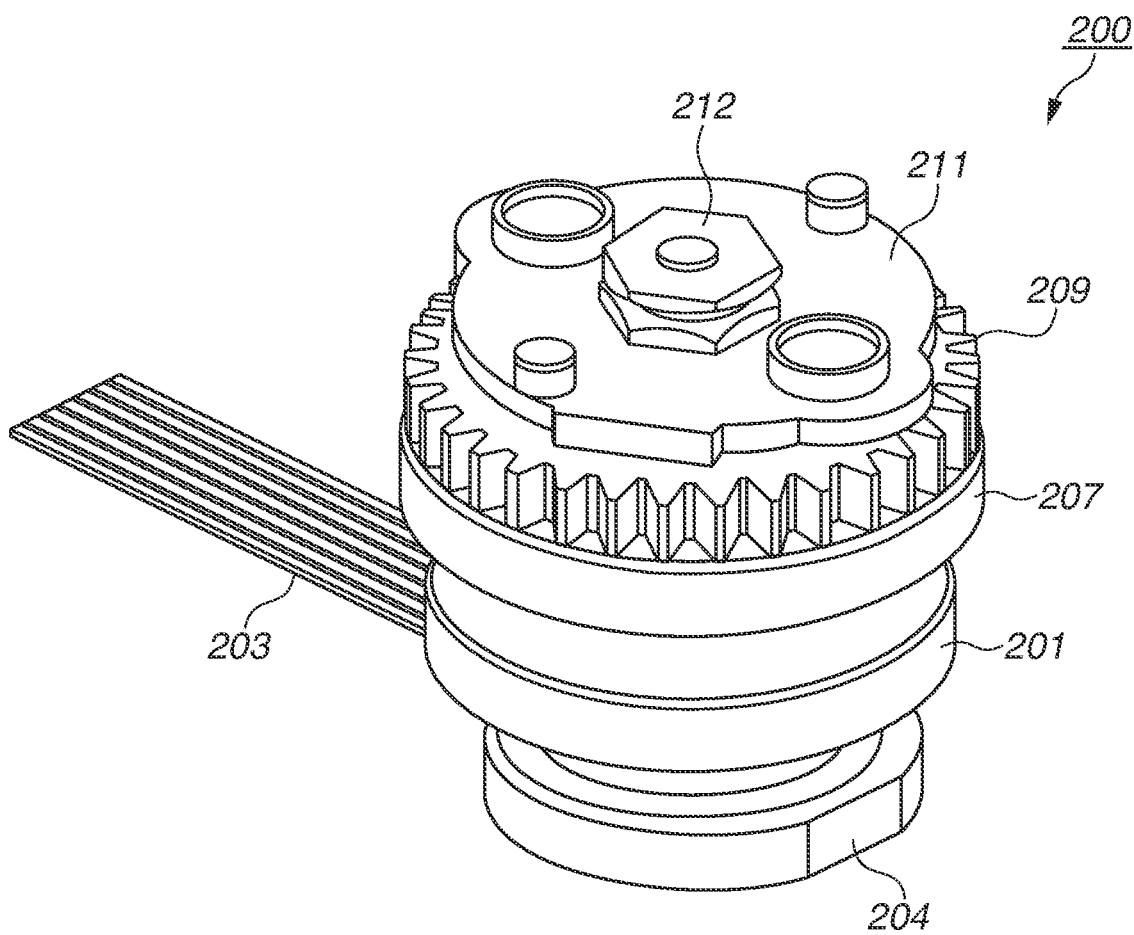
FIG. 14 is a perspective view illustrating a vibration motor (after assembly) according to the present disclosure.

The first to fourth exemplary embodiments preferably include a storage unit configured to store the target velocity, the pulse width, and the frequency when at least one of the pulse width or the frequency is controlled (third setting) so as to cause the relative movement between the vibration body and the contact body. This is because, at this time, the control unit can set the pulse width and frequency (first setting), change the pulse width and frequency (second setting), and control the pulse width and frequency (third setting) based on the target velocity, the pulse width, and the frequency stored in the storage unit. Since the pulse width and frequency for driving the vibration motor at the target velocity can change depending on an environment change or the like, making the settings and changes and performing control based on the target velocity, the pulse width, and the frequency most recently stored in the storage unit allows more accurate settings, changes, and control. The vibration motor, which is a control target of the control apparatus 100 for the vibration motor according to the present disclosure, is the vibration motor 200 illustrated in FIG. 14. However, the vibration motor, which is the control target of the control apparatus 100 for the vibration motor according to the present disclosure, is not limited to this vibration motor 200.

Figure 12:
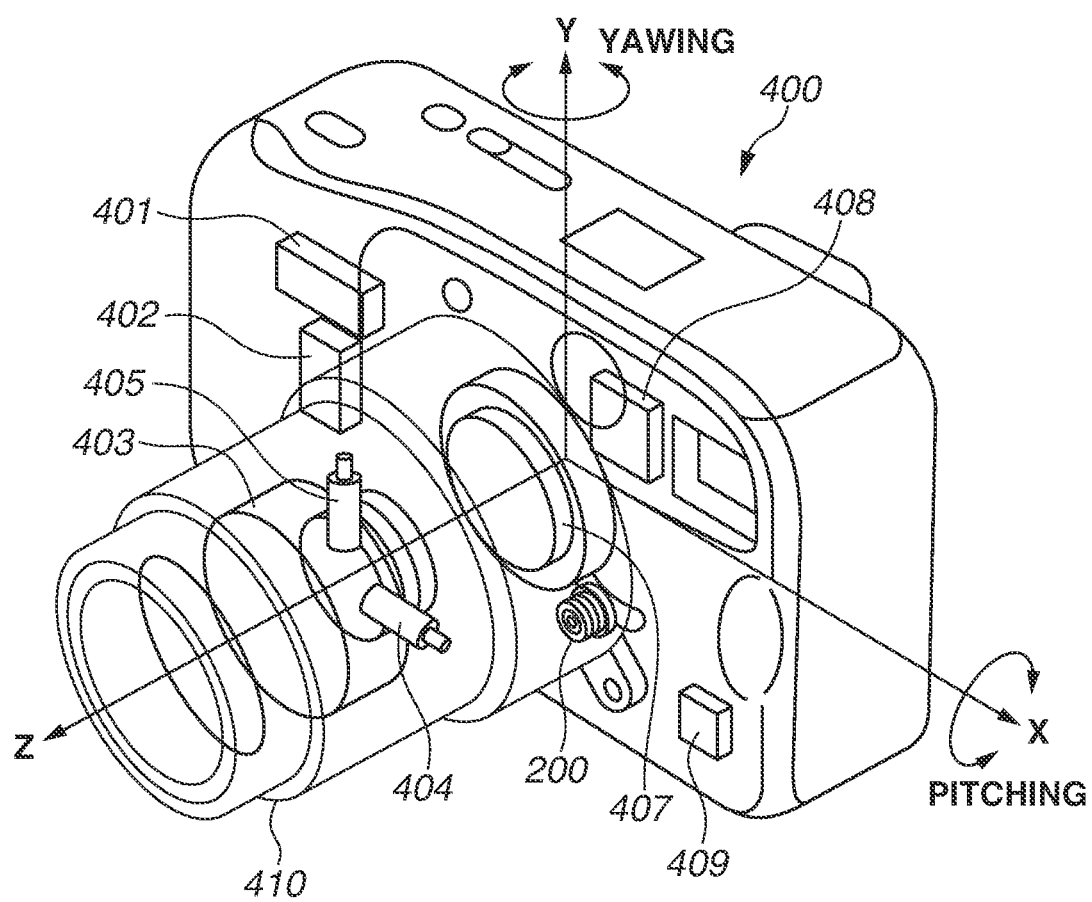
FIG. 12 illustrates a camera apparatus using a control apparatus for a vibration motor according to the present disclosure.

FIG. 12 illustrates a camera apparatus 400 (image-pickup apparatus) using a control apparatus for a vibration motor according to the present disclosure. FIG. 12 is a perspective view schematically illustrating the camera apparatus 400 in a partially transmissive state. Similarly to the first to fourth exemplary embodiments, a hardware configuration of the control apparatus according to a fifth exemplary embodiment is the same as the control apparatus illustrated in FIG. 1.

A lens barrel 410 (lens apparatus) is mounted on the front side of a digital camera 400 (camera apparatus). The lens apparatus is not limited to the one fixed to the camera apparatus, and may employ an aspect (exchangeable lens) attachable to and detachable from the camera apparatus. A plurality of lenses (not illustrated) including a focus lens 407 and a camera shake correction optical system 403 are arranged inside the lens barrel 410. The camera shake correction optical system 403 is capable of performing correction operation in an up-and-down direction (Y-direction) and a side-to-side direction (X-direction) by rotation of biaxial coreless motors 404 and 405, respectively, being transmitted to the camera shake correction optical system 403.

An image-pickup element 408 is mounted on an optical axis of the lenses on the main body side of the digital camera 400. Light having passed through the lens barrel 410 is formed into an optical image on the image-pickup element 408. The image-pickup element 408 is a photoelectric conversion device, such as a complementary metal-oxide semiconductor (CMOS) sensor and a charge-coupled device (CCD) sensor, and converts the optical image into analog electric signals. The analog electric signals output from the image-pickup element 408 are converted into digital signals by an analog-to-digital (A/D) converter (not illustrated), thereafter subjected to predetermined image processing by an image processing circuit (not illustrated), and then stored as image data (video image data) in a storage medium (not illustrated), such as a semiconductor memory.

Furthermore, a gyro sensor 401 and a gyro sensor 402 are arranged on the main body side (camera apparatus side) of the digital camera 400. The gyro sensor 401 detects a camera shake amount (vibration) in the up-and-down direction (pitching). The gyro sensor 402 detects a camera shake amount (vibration) in the side-to-side direction (yawing). The coreless motor 404 is driven in a direction opposite to a direction of vibration detected by the gyro sensor 401, and the coreless motor 405 is driven in a direction opposite to a direction of vibration detected by the gyro sensor 402, and thereby vibrating the optical axis of the camera shake correction optical system 403 extending in a Z-direction. As a result, the vibration on the optical axis caused by the camera shake is canceled, and thereby preferable photographing after camera shake correction can be achieved.

The vibration motor 200 is controlled by the control method described in the first to fourth exemplary embodiments. The vibration motor 200 drives the focus lens 407, which is arranged in the lens barrel 410, in the optical axis direction (Z-direction) via a gear train (not illustrated). However, the driving is not limited thereto. The vibration motor 200 can be used to drive any lens, such as a zoom lens (not illustrated). The control apparatus 100 for the vibration motor illustrated in FIG. 1 for driving the vibration motor 200 by the driving method described in any one of the first to fourth exemplary embodiments is incorporated as a control circuit 409 on the main body side of the digital camera 400.

Figure 13:
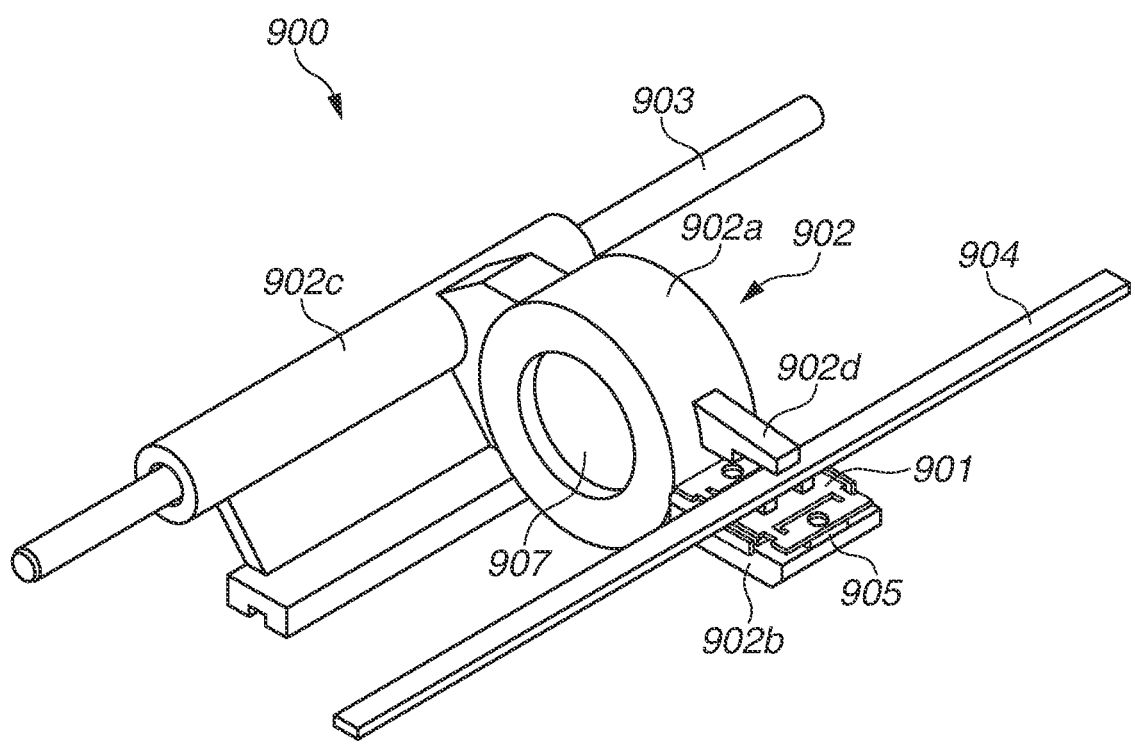
FIG. 13 illustrates a lens driving apparatus using a control apparatus for a vibration motor according to the present disclosure.

FIG. 13 illustrates a lens driving apparatus using a control apparatus 100 for a vibration motor according to the present disclosure. The vibration motor includes a vibration body 901, a second guide bar 904 (contact body), and a pressure magnet 905 (pressure member) described below. The vibration motor used in the lens driving apparatus illustrated in FIG. 13 is a so-called linear type (linear-driving type) vibration motor. The lens driving apparatus (a lens driving mechanism unit 900) includes a lens holder 902 serving as a driven body, the vibration body 901 configured to drive the lens holder 902, the pressure magnet 905, a first guide bar 903, the second guide bar 904, and a base body (not illustrated). In this manner, the vibration motor that causes relative movement between the vibration body 901 and the second guide bar 904 (contact body) as described above can utilize the driving method according to the present proposal. The relative movement between the vibration body and the contact body in the lens driving apparatus illustrated in FIG. 13 occurs in the latter case of the following cases: a case where the vibration body is fixed and the contact body is driven, and a case where the contact body is fixed and the moving body is driven.

Figure 15:
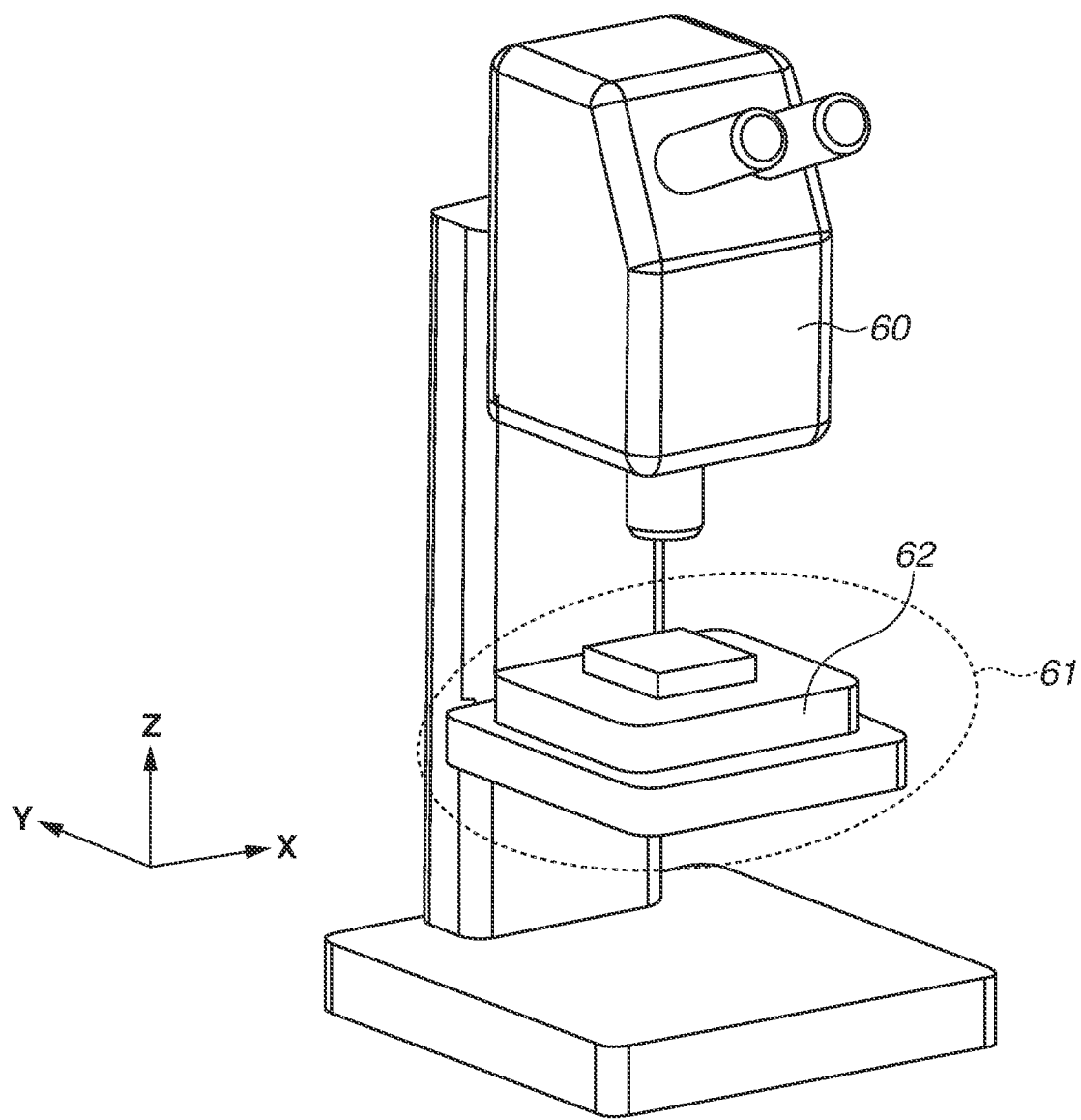
FIG. 15 illustrates an automatic stage using a control apparatus for a vibration motor according to the present disclosure and a microscope having the automatic stage.
Figure 16:
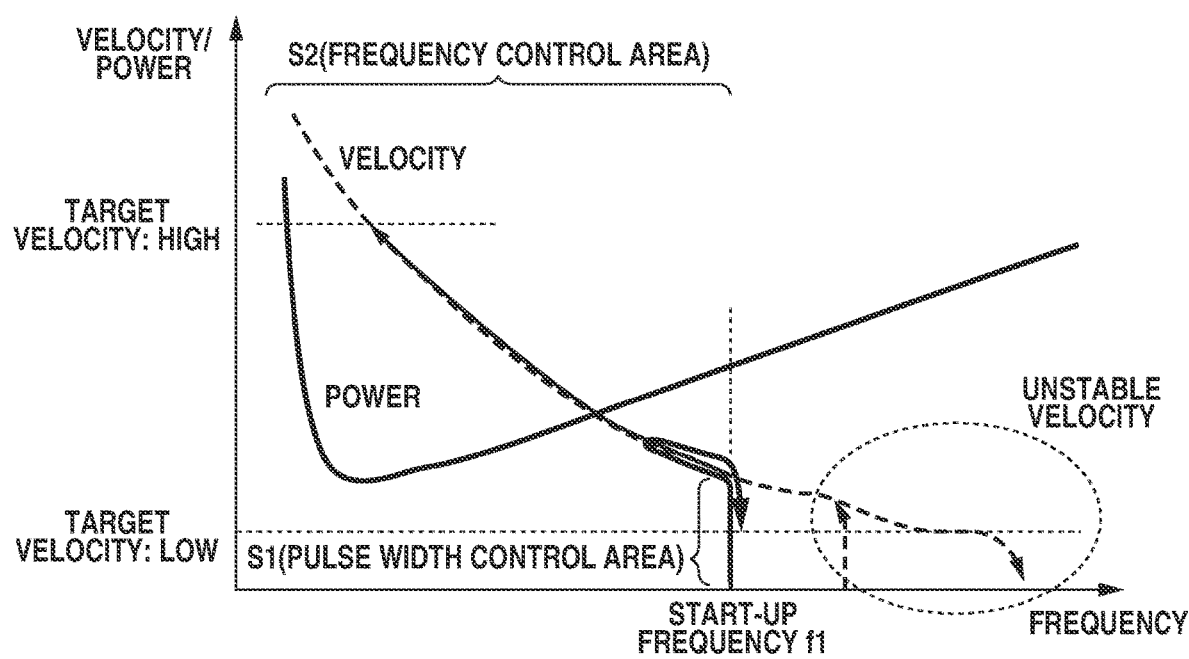
FIG. 16 is a graph diagram illustrating a relationship between a frequency and a velocity and power, and a pulse width control area and a frequency control area, in a case where a vibration motor is controlled by a control apparatus for a vibration motor according to a conventional example.
Figure 17:
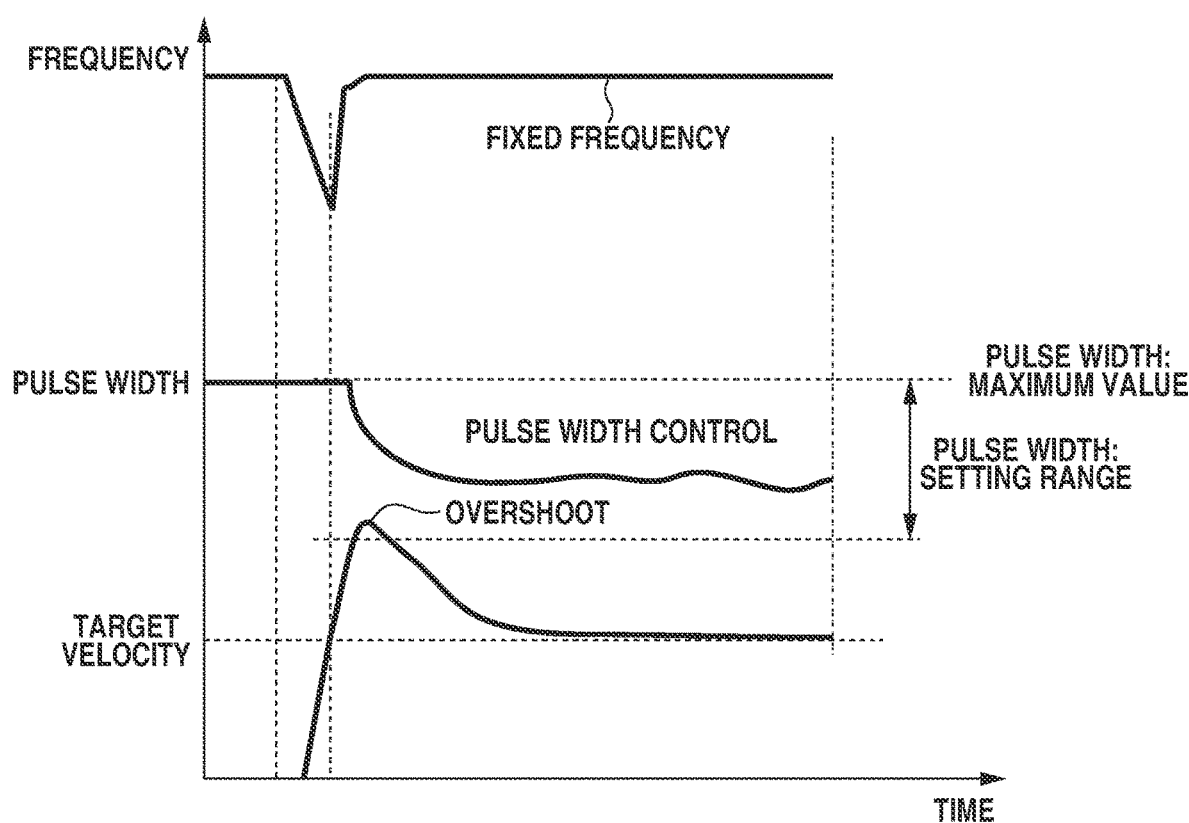
FIG. 17 is a graph diagram illustrating a relationship between time and a frequency, time and a pulse width, and time and a velocity, in a case where the vibration motor is controlled by the control apparatus for the vibration motor according to the conventional example.
Figure 18:
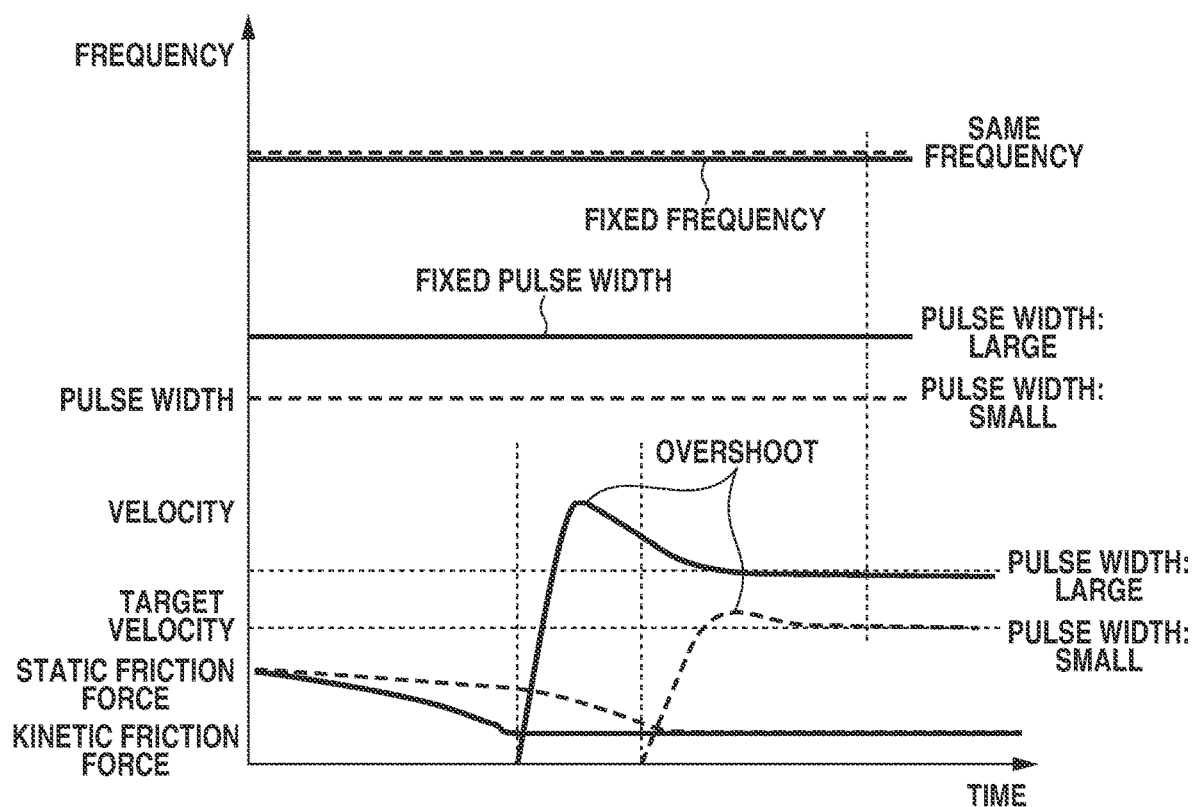
FIG. 18 is a graph diagram illustrating a relationship between time and a frequency, time and (large and small) pulse widths, time and a velocity, and time and friction force, in a case where the vibration motor is controlled by the control apparatus for the vibration motor according to the conventional example.

FIG. 15 illustrates an automatic stage using a control apparatus 100 for a vibration motor according to the present disclosure and a microscope including the automatic stage. The microscope illustrated in FIG. 15 includes, and an automatic stage 61. In the image-pickup unit 60, an image-pickup element and an optical system are incorporated. The automatic stage 61 includes a stage 62, which is mounted on a base and moved by a vibration driving apparatus. A substance to be observed is placed on the stage 62, and an enlarged image is captured by the image-pickup unit 60. In a case where an observation range is wide, the substance to be observed is moved in the X-direction or Y-direction illustrated in FIG. 15 by moving the stage 62 by the vibration driving apparatus, so that a number of captured images are obtained.

One piece of high-definition image covering a wide observation range can be obtained by synthesizing the captured images by a computer (not illustrated).

The control apparatus for the vibration motor according to the present disclosure can prevent prolongation of the start-up time while preventing the velocity overshoot caused by the pulse width and frequency set before the start-up.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-180974, filed Sep. 30, 2019, which is hereby incorporated by reference herein in its entirety.

What is claimed is:

1. A control apparatus for a vibration motor, wherein the vibration motor includes a vibration body having an electro-mechanical energy conversion element, and a contact body in contact with the vibration body, and wherein the control apparatus is configured to apply a plurality of alternating voltages, generated based on a plurality of pulse signals, to the electro-mechanical energy conversion element to cause relative movement between the vibration body and the contact body, the control apparatus comprising:
a control unit configured to control a pulse width and frequency of the plurality of pulse signals to cause the relative movement between the vibration body and the contact body at a target velocity, wherein the control unit is configured to perform operations including:
setting the pulse width and the frequency such that a first steady velocity based on the pulse width and the frequency exceeds the target velocity, before the relative movement between the vibration body and the contact body starts,
changing at least one of the pulse width or the frequency such that a second steady velocity at a time of the relative movement between the vibration body and the contact body is less than the first steady velocity, after the relative movement between the vibration body and the contact body starts, and before an actual velocity at a time of the relative movement between the vibration body and the contact body exceeds the target velocity, and
controlling at least one of the pulse width or the frequency such that the relative movement between the vibration body and the contact body is performed at the target velocity, after said changing at least on or the pulse width or the frequency.

2. The control apparatus according to claim 1, further comprising a detection unit configured to detect the actual velocity,
wherein, after the detection unit detects a predetermined value of the actual velocity, and before the detection unit detects a value of the actual velocity that exceeds the target velocity, changing includes changing at least one of the pulse width or the frequency such that the second steady velocity is less than the first steady velocity.

3. The control apparatus according to claim 1, wherein, after at least one of the pulse width or the frequency has been changed by the control unit, the first steady velocity is 90% or more and 110% or less of the target velocity.

4. The control apparatus according to claim 1, wherein, after at least one of the pulse width or the frequency has been changed by the control unit, the first steady velocity is substantially equal to the target velocity.

5. The control apparatus according to claim 1, wherein, after at least one of the pulse width or the frequency has been changed by the control unit, the first steady velocity is 70% or more and 90% or less of the target velocity.

6. The control apparatus according to claim 1, further comprising a storage unit configured to store the target velocity, the pulse width, and the frequency used when at least one of the pulse width or the frequency is controlled such that the relative movement is performed at the target velocity, wherein the control unit is configured to make settings of the pulse width and the frequency, change the pulse width and the frequency, and perform control of the pulse width and the frequency based on the target velocity, the pulse width, and the frequency stored in the storage unit.

7. A vibration apparatus comprising:
the control apparatus for the vibration motor according to claim 1; and
the vibration motor, wherein the vibration motor is configured to be driven by the control apparatus.

8. An image pickup apparatus comprising:
the control apparatus for the vibration motor according to claim 1;
the vibration motor, wherein the vibration motor is configured to be driven by the control apparatus;
a lens configured to be driven by the vibration motor; and
an image pickup element mounted on an optical axis of the lens.

9. An image pickup apparatus comprising:
the control apparatus for the vibration motor according to claim 1;
the vibration motor, wherein the vibration motor is configured to be driven by the control apparatus;
an image pickup element configured to be driven by the vibration motor; and
a lens, on an optical axis of which the image pickup element is arranged.

10. A lens apparatus comprising:
the control apparatus for the vibration motor according to claim 1;
the vibration motor, wherein the vibration motor is configured to be driven by the control apparatus; and
a lens configured to be driven by the vibration motor.

11. An automatic stage comprising:
the control apparatus for the vibration motor according to claim 1;
the vibration motor, wherein the vibration motor is configured to be driven by the control apparatus; and
a stage configured to be driven by the vibration motor.

12. A method for a control apparatus for a vibration motor, wherein the vibration motor includes a vibration body having an electro-mechanical energy conversion element, and a contact body in contact with the vibration body, wherein the control apparatus is configured to apply a plurality of alternating voltages, generated based on a plurality of pulse signals, to the electro-mechanical energy conversion element to cause relative movement between the vibration body and the contact body, the method comprising:

controlling a pulse width and frequency of the plurality of pulse signals to cause the relative movement between the vibration body and the contact body at a target velocity, wherein controlling further includes:

setting the pulse width and the frequency such that a first steady velocity based on the pulse width and the frequency exceeds the target velocity, before the relative movement between the vibration body and the contact body starts, changing at least one of the pulse width or the frequency such that a second steady velocity at a time of the relative movement between the vibration body and the contact body is less than the first steady velocity, after the relative movement between the vibration body and the contact body starts, and before an actual velocity at a time of the relative movement between the vibration body and the contact body exceeds the target velocity, and controlling at least one of the pulse width or the frequency such that the relative movement between the vibration body and the contact body is performed at the target velocity, after said changing at least on or the pulse width or the frequency.

13. A non-transitory computer-readable storage medium storing a program to cause a computer to perform a method for a control apparatus for a vibration motor, wherein the vibration motor includes a vibration body having an electro-mechanical energy conversion element, and a contact body in contact with the vibration body, wherein the control apparatus is configured to apply a plurality of alternating voltages, generated based on a plurality of pulse signals, to the electro-mechanical energy conversion element to cause relative movement between the vibration body and the contact body, the method comprising:

controlling a pulse width and frequency of the plurality of pulse signals to cause the relative movement between the vibration body and the contact body at a target velocity, wherein controlling further includes:

setting the pulse width and the frequency such that a first steady velocity based on the pulse width and the frequency exceeds the target velocity, before the relative movement between the vibration body and the contact body starts, changing at least one of the pulse width or the frequency such that a second steady velocity at a time of the relative movement between the vibration body and the contact body is less than the first steady velocity, after the relative movement between the vibration body and the contact body starts, and before an actual velocity at a time of the relative movement between the vibration body and the contact body exceeds the target velocity, and controlling at least one of the pulse width or the frequency such that the relative movement between the vibration body and the contact body is performed at the target velocity, after said changing at least on or the pulse width or the frequency.

* * * * *